Aug. 23, 1938.  W. F. MATHEWSON  2,127,647
MEASURING VALVE FOR ICE CREAM FREEZERS
Filed June 15, 1935   3 Sheets-Sheet 2
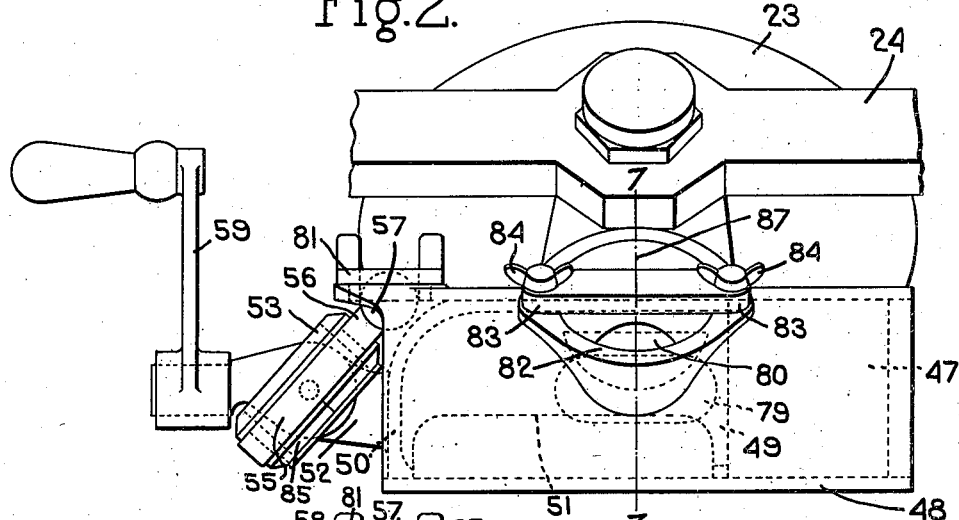
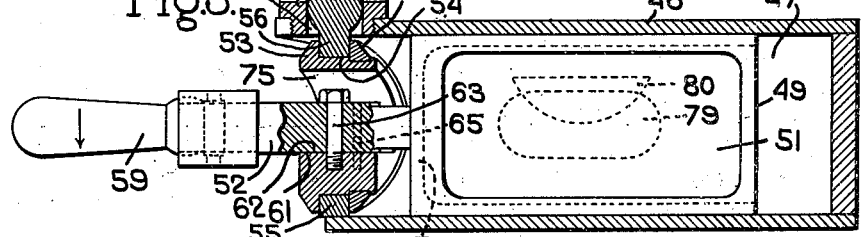
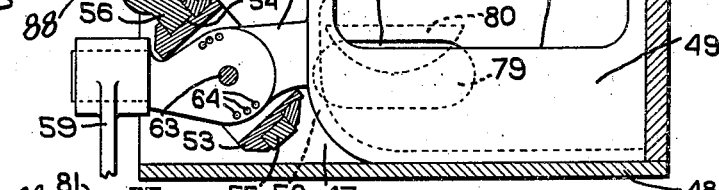
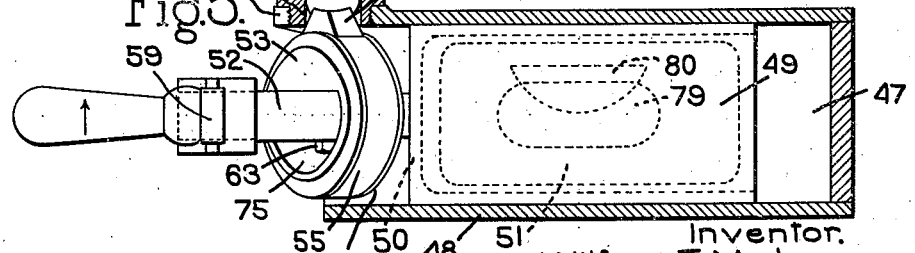
Inventor.
Wilfred F. Mathewson
by Heard Smith & Tennant.
Attys.

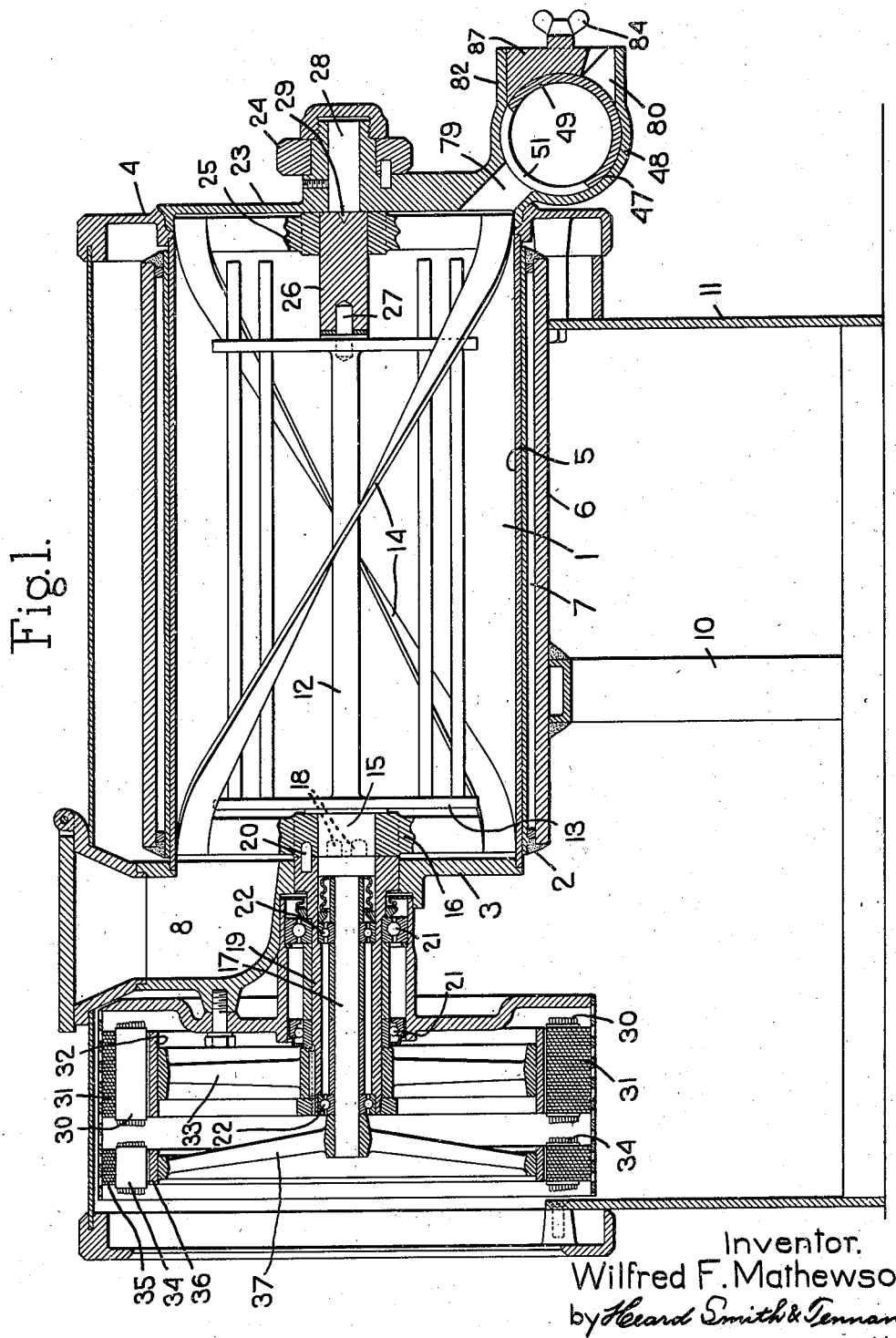

Aug. 23, 1938.   W. F. MATHEWSON   2,127,647
MEASURING VALVE FOR ICE CREAM FREEZERS
Filed June 15, 1935   3 Sheets-Sheet 3
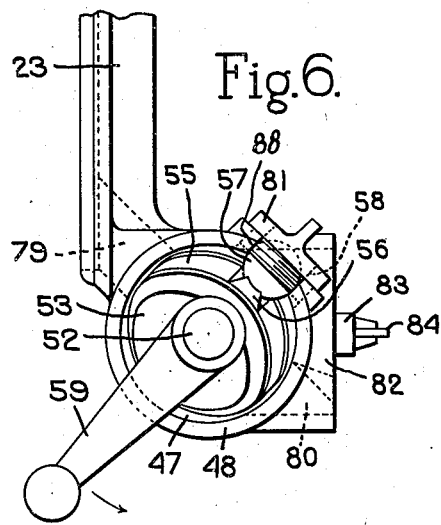
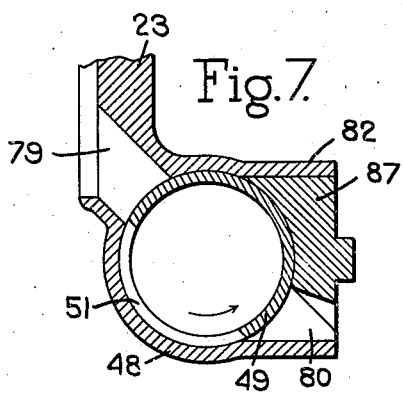
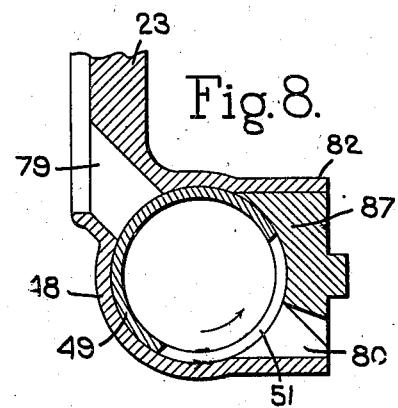
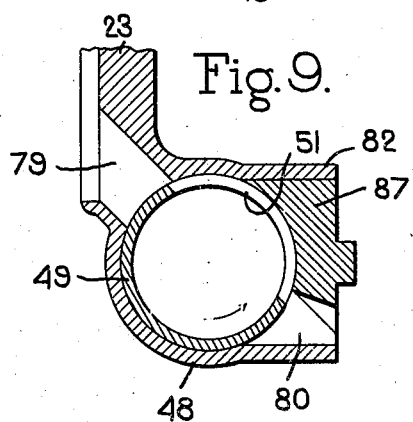
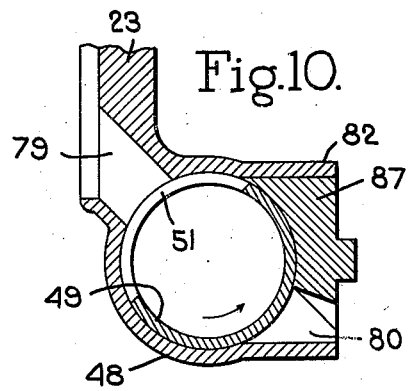
Inventor.
Wilfred F. Mathewson
by Heard Smith & Tennant.
Attys.

Patented Aug. 23, 1938

2,127,647

UNITED STATES PATENT OFFICE 2,127,647

MEASURING VALVE FOR ICE CREAM FREEZERS

Wilfred F. Mathewson, North Weymouth, Mass.

Application June 15, 1935, Serial No. 26,738

9 Claims. (Cl. 221—103)

This invention relates to an ice-cream freezer and has for one of its objects to provide an ice-cream freezer with novel means for rotating the stirring elements, and for another object to provide an ice-cream freezer with novel means for dispensing measured quantities of ice-cream directly from the freezer chamber into suitable receptacles therefor. Such receptacles may be cone-shaped receptacles of paper or other material, each designed to hold a serving of ice-cream and which may be used to hold the separate servings while they are being hardened in a hardening chamber or being stored ready for sale at which time the individual servings will be transferred from the temporary paper receptacle to an ice-cream cone or to a suitable dish from which it will be consumed. If desired also the ice-cream may be dispensed from the freezer directly into the ice-cream cones.

The ordinary way of selling individual servings of ice-cream is to dish up the separate servings from a container that is stored in a refrigerated chamber into ice-cream cones or other dishes. With my improvements it is possible to divide the ice-cream as it comes from the freezer chamber into separate servings and to retain these servings separate during the hardening operation and until they are called for over the counter.

In order to give an understanding of the invention I have illustrated in the drawings a selected embodiment thereof which will now be described after which the novel features will be pointed out in the appended claims.

Fig. 1 is a sectional view of an ice-cream freezer embodying my invention.

Fig. 2 is a fragmentary view of the end of the ice-cream freezer showing one form of measuring valve for dispensing measured quantities of ice-cream from the freezer.

Figs. 3, 4 and 5 are longitudinal sectional views through the valve showing it in different positions.

Fig. 6 is an end view of the valve shown in Fig. 2.

Figs. 7, 8, 9 and 10 are sectional views taken on substantially the line 7—7 Fig. 2 illustrating different positions of the valve.

The ice-cream freezer shown herein comprises the usual freezing chamber 1 in which the ice-cream is frozen, said chamber being shown as having the usual jacketed wall 2 and the two heads 3 and 4. The jacketed wall 2 is formed with the inner and outer shells 5 and 6 which form between them a chamber 7 through which the refrigerating medium is circulated. The head 3 is formed with the inlet opening 8 through which the ice-cream mixture may be introduced into the chamber 1 and the head 4 is formed with a discharge opening 79 through which the frozen ice-cream is discharged. The ice-cream freezer is shown as mounted on a suitable support comprising the supporting member 10 and the supporting plate 11. The stirring elements operating within the chamber 1 may have any suitable or usual construction and can comprise an inner rotating stirring element 12 and an outer stirring element 13 having two spiral scraping blades 14. The inner stirring element 12 is formed with a hub 15 at one end which is journalled in the head 16 of the outer stirring element 13, and the hub 15 of the inner element is connected to a driving shaft 17 by means of a suitable pin clutch connection 18, while the head 16 of the outer stirring element is connected to a second driving shaft 19 through a suitable pin clutch connection 20. The shaft 19 is in the form of a sleeve which is supported in suitable bearings 21 and the inner shaft 17 extends through the sleeve shaft 19 and is supported in suitable bearings 22.

The head 4 of the freezing chamber is provided with a door 23 which is carried by an arm 24 that is hinged to the head 4, said door 23, when open, providing an opening through which the stirring elements can be removed from the chamber 1 or inserted therein. The outer stirring element 13 is formed at its outer end with a head 25 through which extends a bearing member 26 that supports the outer end of the inner stirring member 12, said member 12 and bearing member 26 being connected together by a suitable pin 27. The door 23 carries a centering pin 28 having a pointed projection 29 adapted to be received in an axial recess in the end of the member 26. This projection 29 thus serves to center the member 26 and thereby centers the stirring members 12 and 13.

The two shafts 17 and 19 are rotated at different speeds by electric motors having the rotating elements of the motor mounted directly on the shafts. The stator portion of the electric motor for rotating the shaft 19 comprises a plurality of coils 30 which are carried by a laminated ring support 31, and the rotor portion of said motor is in the form of a sleeve 32 surrounding and carried by the spider 33 that is fast on the shaft 19.

The electric motor for operating the shaft 17 comprises the stator portion in the form of suitable coils 34 carried by the laminated ring 35 and the rotor portion comprises the sleeve 36 operating inside the coils and carried by the wheel 37 which is fast to the shaft 17. By using induction motors of this type the driving mechanism for the stirring elements is simplified and the use of gears and belts is avoided.

As stated above the ice-cream freezer is provided with means for dispensing measured quantities of ice-cream from the chamber 1, and in the embodiment herein illustrated such means comprises a valve 49 which operates in a valve chamber 47 formed in a valve casing 48 that is secured to the door 23 and is provided with a port 79 which constitutes a discharge port for the freezing chamber 1 and an inlet port for the valve, and is also provided with an outlet or discharge port 80 through which the measured quantity of ice-cream is discharged. Situated within the valve chamber 47 is a rotary valve 49 which is in the form of a cylindrical shell and which is closed at one end as shown at 50, the other end being open. Said valve 49 is also cut away on one side to provide the port 51 which is brought into register with the inlet port 79 and the discharge port 80 alternately as the valve is rotated.

The measuring chamber of the valve shown in Figs. 2 and 5 is constituted by the space within the hollow valve 49 and the portion of the valve chamber 47 with which the open end of said valve communicates. This measuring chamber contracts and expands in volume when the port 51 is in communication with the inlet port 79 as shown in Fig. 10 thereby creating a suction in the measuring chamber which assists the flow of the ice-cream thereinto from the freezing chamber, and contracting in volume when the port 51 is in register with the discharge or delivery port 80, thereby forcing the ice-cream from the measuring chamber out through the port 80. The valve 49 is mounted in the valve chamber for movement longitudinally thereof and the expanding and contracting of the volume of the measuring chamber is secured by such longitudinal movement of the valve 49. When said valve moves to the left in the valve casing and the closed end 50 of the valve moves away from the opposite end of the valve chamber, the chamber will be expanded for volume, while when the valve moves to the right and the closed end 50 approaches the opposite end of the valve chamber the measuring chamber is contracted in volume.

Means are provided for moving the valve 49 longitudinally of the valve chamber as the latter is turned, said valve having one complete back-and-fourth reciprocation for each rotation thereof. As the valve rotates and the port 51 thereof is brought into register with the inlet port 79 (see Fig. 10) the valve will be moved toward the left, thus expanding the measuring chamber, and the ice-cream from the freezing chamber will flow through the ports 79 and 51 into the hollow valve member. As the valve continues its rotation the inlet port 79 will be closed as shown in Fig. 8 and the valve port 51 will be brought into register with the delivery port 80. During this time the valve is moving toward the right and the measuring chamber is being contracted in size so that the ice-cream therein will be forced out through the port 80.

For giving the valve 49 its simultaneous rotary and longitudinal movements I have provided the following mechanism. The closed end 50 of the valve 49 has a stem 52 extending therefrom on which is rigidly mounted a cylindrical member 53 having an angular relation to the axis of the valve. This cylindrical member 53 is provided with a peripheral groove 54 in which is received a ring member 55 that is formed with an extension 56 having a ball-shaped end 57. This ball member is received in a socket 58 formed in a sleeve or socket member 81 which is screw-threaded to the valve casing 48, said socket being cylindrical in form and fitting the ball 57 so that the ball can move axially of the socket. Since the member 53 is rigidly secured to the stem 52, the rotation of the stem will transmit rotary movement to the member 53 which will thus rotate within the ring 55. Because of the angular relation of the member 53 relative to the axis of rotation and because the ring 55 is anchored at one side of the axis of rotation by the ball portion 57, such rotary movement of the ring member will produce a longitudinal movement of the stem 52 and valve 49 as shown in Figs. 2 to 5.

The stem may be rotated by any suitable means. One way is by means of a handle 59 which is secured to the stem and which may be manually-operated.

When the parts are in the position shown in Figs. 5 and 10 the port 51 in the valve will be registering with the inlet port 79 and the valve is at the left-hand end of its stroke. At this time the discharge port 80 is closed and ice-cream from the chamber 1 will flow through the inlet port 79 and valve port 51 thereby filling the valve chamber. As the valve is turned in the direction of the arrows Fig. 10 first, into the position shown in Figs. 2 and 7 and then into the position shown in Figs. 3 and 8, the valve port 51 will be moved out of register with the inlet port 79 thereby closing the latter and into register with the discharge port 80 thereby opening said port. During this turning movement the valve is moved toward the right as seen in Figs. 3 and 4, by the operation of the member 53 and ring 55. The movement of the closed end 50 of the valve toward the right forces the ice-cream within the valve out through the discharge port 80. As the valve continues its rotary and reciprocating movement the discharge port 80 will be closed and the valve port 51 will be brought into register with the inlet port 79 as shown in Figs. 9 and 10, and at the same time the valve will be moved to the left into the position shown in Fig. 2, thereby producing a suction within the valve 49 which will assist in inducing a flow of ice-cream from the freezing chamber 1 through the port 79 into the interior of the valve.

At each rotation of the valve, therefore, a measured quantity of ice-cream will be taken from the freezing chamber 1 and discharged through the discharge port 80. The valve may be constructed to deliver any desired amount of ice-cream at each operation thereof, but I contemplate that the invention will find its greatest use when embodied in a construction designed to deliver at each operation sufficient ice-cream for a single serving. Such a machine is extremely effective in filling containers with single servings of ice-cream, which containers are to be stored in a hardening chamber for a period of time before the ice-cream is sold.

The circular member 53 may be secured to the stem 52 in any appropriate way. As herein shown said member 53 has an opening 75 therethrough through which the stem 52 extends, said opening being formed with a flat face 61 adapted to engage a flat face 62 of the stem. The cylindrical member 53 is secured to the stem by means of a bolt 63 which extends through the stem and screws into the member 53 as shown best in Fig. 3. The amount of ice-cream which is delivered at each operation of the valve is determined by the extent of the longitudinal movement thereof and in the construction shown I have provided means for varying the amplitude of such longitudinal movement. This amplitude is determined by the angular position of the cylindrical member 53, and I have provided, therefore, means whereby this angular position of said member may be changed. The stem 52 is shown as having a plurality of apertures 64 in one of which is received a positioning pin 65 that is anchored in the member 53. The angular position of the member 53 is determined by the particular aperture 64 in which the positioning pin is located. If it is desired to adjust the angular relation of the member 53, the valve is brought into the position shown in Fig. 2 and the socket member 81 is unscrewed from the valve housing and the bolt 63 may be backed off sufficiently to unscrew it from the member 53. This will allow the member 53 to be manipulated so as to withdraw the pin 65 from the aperture 64 and said member may then be adjusted into its different angular position and the parts reassembled with the positioning pin 65 occupying a different aperture 64. After the member 53 has been readjusted then the socket member 81 is again attached to the valve housing with the ball 57 occupying the socket 58 thereof. The portion of the valve casing into which the socket member 81 is screwthreaded is provided with an open slot 88 large enough to receive the ball 57, said slot permitting the ring 55 to be manipulated during its adjustment.

I have stated above that the ring 55 is received in a groove 54 in the form on the periphery of the member 53. To provide for easily assembling the parts the member 53 is constructed with a split ring 85 which forms one wall of the groove 54, and in assembling the parts the ring 55 is applied to the member 53 while the split ring 85 is removed therefrom and after the member 53 has been inserted through the ring 55 then the split ring 85 can be expanded and snapped into place, thereby retaining the member 53 and ring 55 in their assembled relation.

In the construction shown the delivery port 80 is formed in a plug 81 which is received in the tubular extension 82 of the valve casing. This plug is provided with ears 83 through which extend clamping bolts carried by the extension 83, said bolts being provided with clamping nuts 84 by which the plug is clamped in position.

While I have illustrated herein one embodiment of the invention I do not wish to be limited to the constructional features shown.

I claim:

1. A dispensing device for an ice-cream freezer comprising a measuring valve device having a valve chamber provided with an inlet port communicating with the freezing chamber of the freezer and also provided with a delivery port, a piston valve in said chamber capable of both reciprocatory and rotary movement, said valve by its reciprocatory movement increasing and decreasing the size of the chamber and by its combined reciprocatory and rotary movement alternately opening and closing each port, means to rotate the valve, and means actuated by the rotation thereof to produce its reciprocatory movement, said last-named means being adjustable thereby to vary the amplitude of such reciprocatory movement.

2. A device of the class described comprising a valve casing having a valve chamber and provided with an inlet port and a discharge port, a piston valve in said chamber capable of both reciprocatory and rotary movement, said valve by its reciprocatory movement increasing and decreasing the size of said chamber and by its combined reciprocatory and rotary movement alternately opening and closing each port, said valve having a valve stem, a collar rigidly secured to the valve stem in a position inclined to the valve axis, a non-rotatable ring in which the collar is mounted to rotate, means to hold said ring from rotating while permitting it to swing in an axial direction and to turn about an axis at right angles to the valve axis, and means to rotate the valve whereby rotation of the collar in the ring produces an axial movement of the valve as it rotates.

3. A device of the class described comprising a valve casing provided with an inlet port and a discharge port, a rotary hollow valve within said casing, said valve having a valve port which registers alternately with the inlet and discharge ports as the valve rotates, said valve also having a valve stem, a collar rigidly secured to said valve stem in a position inclined to the valve axis, a non-rotatable ring in which the collar is mounted to rotate, said ring having a ball extension, and a stationary socket member in which said ball is received whereby rotation of the valve and collar produces a reciprocating movement of the valve in the direction of its axis.

4. A device of the class described comprising a valve chamber having an inlet port and a discharge port, a hollow rotary valve in the valve chamber, said valve having a valve stem and also having a valve port which registers with the inlet port and discharge port alternately as the valve rotates, a collar fast on the valve stem and formed with a peripheral groove occupying a plane inclined to the valve axis, a ring received in said groove, means engaging the ring and holding it against rotary movement while permitting it to swing in the direction of the valve axis and means to rotate the valve member, said collar and ring causing the valve to have an axial movement as it rotates.

5. A device of the class described comprising a valve chamber having an inlet port and a discharge port, a hollow rotary valve in the valve chamber, said valve being open at one end and closed at the other and having a valve port in its side wall which registers with the inlet port and discharge port alternately as the valve rotates, a valve stem rigid with the valve, means to rotate the valve, and means to cause the valve to move back and forth in an axial direction as it rotates, said latter means comprising a collar fast on the valve stem and formed with a peripheral groove in a plane inclined to the valve axis, a ring received in said groove and means holding the ring against rotary movement while permitting it to swing in the direction of the valve axis.

6. A dispensing device comprising a cylinder member constituting a valve chamber, said valve chamber having an inlet port and also having a discharge port, a hollow rotary valve in the valve chamber, said valve being open at one end and closed at the other end and having a valve port in its side wall which registers with the outlet port and discharge port alternately as the valve rotates, a valve stem rigid with the valve, means to rotate the valve, a collar fast on the valve stem and having a peripheral groove in a plane inclined to the valve axis, a ring received in said groove, and a ball and socket connection between said ring and cylinder member whereby as the valve stem is rotated the valve will be given a movement in the direction of its axis.

7. A dispensing device comprising a cylinder member constituting a valve chamber, said valve chamber having an inlet port and also having a discharge port, a hollow rotary valve in the valve chamber, said valve being open at one end and closed at the other end and having a valve port in its side wall which registers with the outlet port and discharge port alternately as the valve rotates, a valve stem rigid with the valve, means to rotate the valve, a collar carried by the valve stem and having a peripheral groove in a plane inclined to the valve axis, means rigidily securing said collar to the valve stem in any one of a plurality of angular positions, a ring received in said groove, and means holding the ring against rotary movement while permitting it to swing in the direction of the valve axis, whereby as the valve is rotated it will also be moved axially.

8. A dispensing device comprising a valve casing provided with an inlet port and a discharge port, a rotary hollow valve within said chamber, said valve having a valve port which registers alternately with the inlet and discharge ports as the valve rotates, a valve stem rigid with the valve, a collar secured to the valve stem and having a peripheral groove occupying a plane inclined to the valve axis, a ring received in said groove, means engaging the ring and holding it against rotary movement while permitting it to swing in the direction of the valve axis and to turn about an axis at right angles to the valve axis, and means to rotate the valve member, whereby rotation of the collar in the ring causes the valve to have an axial movement as it rotates.

9. A dispensing device comprising, a valve casing provided with an inlet port and also having a discharge port, a rotary hollow valve within said chamber, said valve having a valve port which registers alternately with the inlet and discharge ports as the valve rotates, a valve stem connected to the valve, a collar rigidly secured to the valve stem, a ring in which the collar has rotative movement about an axis inclined to the valve axis, means to hold said ring from rotating while permitting it to swing in an axial direction and to turn about an axis at right angles to the valve axis, and means to rotate the valve whereby rotation of the collar in the ring produces an axial movement of the valve as it rotates.

WILFRED F. MATHEWSON.